US011321112B2

(12) United States Patent
Wu et al.

(10) Patent No.: US 11,321,112 B2
(45) Date of Patent: May 3, 2022

(54) DISCOVERY AND RECREATION OF COMMUNICATION ENDPOINTS IN VIRTUAL MACHINE MIGRATION

(71) Applicant: International Business Machines Corporation, Armonk, NY (US)

(72) Inventors: Ching-Farn E. Wu, Yorktown Heights, NY (US); Niteesh K. Dubey, Yorktown Heights, NY (US); Ramanjaneya S. Burugula, Yorktown Heights, NY (US); Hao Yu, Valhalla, NY (US); Joefon Jann, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 16/390,230

(22) Filed: Apr. 22, 2019

(65) Prior Publication Data
US 2020/0334063 A1    Oct. 22, 2020

(51) Int. Cl.
*G06F 9/455* (2018.01)
*H04L 41/12* (2022.01)

(52) U.S. Cl.
CPC .......... *G06F 9/45558* (2013.01); *H04L 41/12* (2013.01); *G06F 2009/4557* (2013.01); *G06F 2009/45595* (2013.01)

(58) Field of Classification Search
CPC ... G06F 2009/4557; G06F 2009/45595; G06F 9/45558; H04L 41/12
See application file for complete search history.

(56) References Cited

U.S. PATENT DOCUMENTS

| | | | |
|---|---|---|---|
| 9,032,122 B2 | 5/2015 | Hart et al. | |
| 9,104,461 B2 | 8/2015 | Neary et al. | |
| 9,158,578 B1 | 10/2015 | Derbeko et al. | |
| 9,348,655 B1 | 5/2016 | Tsirkin et al. | |
| 9,501,439 B1 | 11/2016 | Fredrickson et al. | |
| 9,542,222 B2 | 1/2017 | Mousseau et al. | |
| 10,228,959 B1 * | 3/2019 | Anderson | G06F 9/546 |
| 2009/0327537 A1 * | 12/2009 | Bakke | G06F 9/5077 710/74 |
| 2010/0122124 A1 * | 5/2010 | Chen | G06F 9/45558 714/57 |
| 2012/0185856 A1 * | 7/2012 | Ashihara | G06F 9/45558 718/1 |

(Continued)

OTHER PUBLICATIONS

Nocentino, A., et al., "Toward Dependency-Aware Live Virtual Machine Migration", Proceedings of the 3rd International Workshop on Virtualization Technologies in Distributed Computing (VTDC '09), Jun. 15, 2009, pp. 59-66.

(Continued)

*Primary Examiner* — Jorge A Chu Joy-Davila
(74) *Attorney, Agent, or Firm* — Scully, Scott, Murphy & Presser, P.C.; Daniel P. Morris

(57) ABSTRACT

Communication endpoints associated with a virtual machine for migration can be discovered. Properties associated with the communication endpoints can be discovered. The communication endpoints can be matched to establish a communication channel between the endpoints. The communication endpoints, the properties and the at least one communication channel can be used in recreating the communication channel for a migrated version of the virtual machine.

20 Claims, 12 Drawing Sheets

(56) References Cited

U.S. PATENT DOCUMENTS

| | | | | |
|---|---|---|---|---|
| 2012/0192182 A1* | 7/2012 | Hayward | ................ | G06F 9/455 |
| | | | | 718/1 |
| 2012/0303799 A1* | 11/2012 | Hadas | ................ | H04L 63/0407 |
| | | | | 709/224 |
| 2013/0139153 A1* | 5/2013 | Shah | ................ | G06F 9/45558 |
| | | | | 718/1 |
| 2016/0077938 A1* | 3/2016 | Keeriyadath | ....... | G06F 11/2033 |
| | | | | 714/4.11 |
| 2016/0092377 A1* | 3/2016 | Sauer | ................ | G06F 1/3243 |
| | | | | 711/163 |
| 2016/0246631 A1* | 8/2016 | Tsirkin | ................ | G06F 9/45558 |
| 2017/0359414 A1* | 12/2017 | Sengupta | ............ | G06F 9/45558 |
| 2018/0052688 A1 | 2/2018 | Arimilli et al. | | |

OTHER PUBLICATIONS

Anitha H.M., "Secure Virtual Machine Migration in Virtualized Environment", Proceedings of the Second International Conference on Inventive Systems and Control (ICISC 2018), Jan. 2018, pp. 938-943.

NIST, "NIST Cloud Computing Program", csrc.nist.gov/groups/SNS/cloud-computing/index.html, Created Dec. 1, 2016, Updated Oct. 6, 2017, 9 pages.

* cited by examiner

DISCOVERY AND RECREATION OF COMMUNICATION ENDPOINTS IN VIRTUAL MACHINE MIGRATION

BACKGROUND

The present disclosure relates generally to computers and computer applications, and more particularly to virtual machine migration.

Virtual Machine (VM) migration allows virtual machines to be migrated from one server to another server. Live migration refers to the process of moving a running virtual machine between different physical machines without disconnecting the client or application. Memory, storage, and network connectivity of the virtual machine are transferred from the original server to the destination server or the target server. For example, Live Partition Mobility (LPM)™ from International Business Machines Corporation (IBM®), Armonk, N.Y., may provide for continuous operations even if there is a planned outage such as for hardware repairs or firmware updates.

BRIEF SUMMARY

A system and method, which can discover and/or recreate communication endpoints in virtual machine migration, may be provided. The system, in one aspect, may include a hardware processor. A memory device may be operatively coupled to the hardware processor. The hardware processor can be operable to discover communication endpoints associated with a virtual machine designated for migration. The hardware processor can be further operable to discover properties associated with the communication endpoints. The hardware processor can be further operable to match the communication endpoints to establish a communication channel between the endpoints. The communication endpoints, the properties and the at least one communication channel can be used in recreating the communication channel for a migrated version of the virtual machine.

A method, in one aspect, can include, for a migrated virtual machine migrated on a target server, recreating a communication endpoint and a matched communication endpoint to establish at least one communication channel between the migrated virtual machine and another logical partition on the target server.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
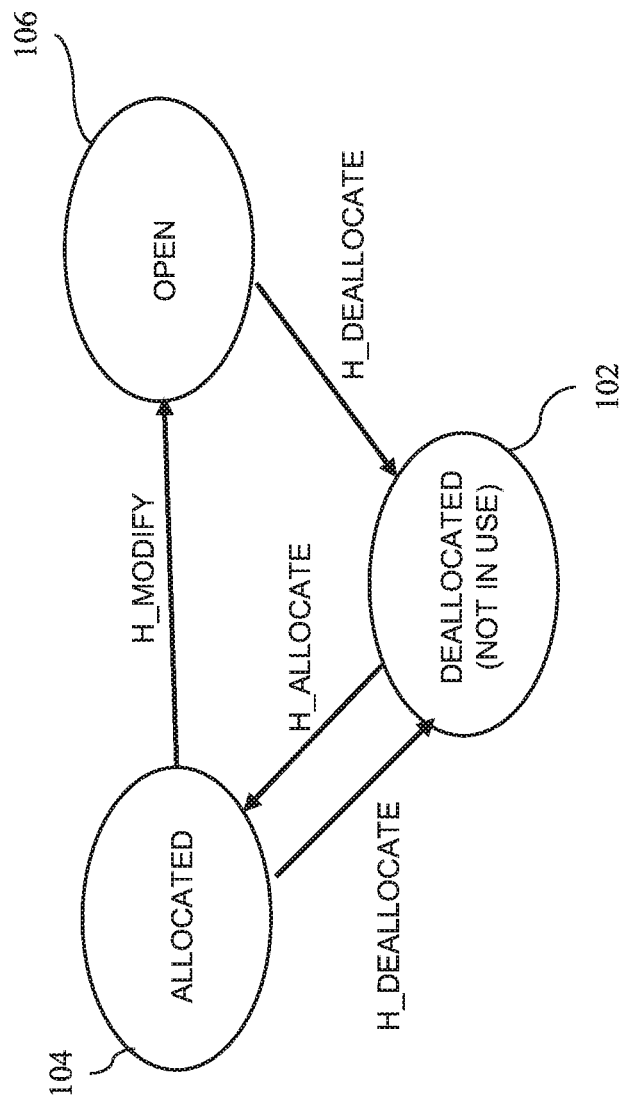
FIG. 1 is a diagram illustrating a state transition diagram of a VAS window and the associated hypervisor calls causing the transitions in one embodiment.

A method, system and technique are disclosed, in embodiments, which can enable virtual machine (VM) migration for virtual machines with one or more communication endpoints for communicating between virtual machines. A method, system and technique, in embodiments, can discover communication endpoints and their properties in virtual machine migration. Using the discovered properties, for example, the method, system and technique, in embodiments, may recreate an endpoint on a target server, for example, to which a virtual machine is migrated.

System resources implementing artificial intelligence and machine learning can include memory, storage, and network. Coprocessors such as graphics processing units (GPUs) and specialized hardware components can also be added, for example, into main stream computing, and become part of system resources. For example, each processor chip in a POWER9™ server from IBM®, may include an accelerator called the Nest Accelerator (NX)™ unit that provides specialized functions for general data compression, gzip compression and encryption. The NX™ unit may include 2 compression engines, for example, gzip and encryption engines. With a firmware, for example, FW920™, the PowerVM® Hypervisor (PHYP) from IBM® can utilize these specialized hardware engines to accelerate compression and encryption operations. To access these engines, logical partitions (also known as (a.k.a.) virtual machines) can issue HCALLs (Hypervisor Calls) to request the hypervisor to perform coprocessor operations on their behalf. The NX™ unit can also be used by operating systems and user applications to take advantage of these facilities without the HCALL overhead. Logical partitions may request direct access to a coprocessor through a mechanism such as IBM®'s Virtual Accelerator Switchboard (VAS)™. VAS™ can be a type of an endpoint, which can be used by a virtual machine to communicate with another virtual machine. A communication endpoint can be a data structure associated with the hardware that is used to make connections between partitions. Once a direct access channel is established, logical partitions may use "copy" and "paste" instruction pairs to issue coprocessor requests and to share data. The VAS facility can provide a number of VAS windows through which logical partitions and user applications may request coprocessor access. It can interconnect user-mode processes in logical partitions and the NX™ hardware engines, and provide high-speed hardware links for logical partitions to share data. VAS windows are system resources defined in the hypervisor for the hardware. They can be allocated to partitions individually.

The VAS facility can interconnect user-mode processes in logical partitions with high-speed hardware links. A number of VAS windows can be provided in the hypervisor to facilitate send and receive operations. Operating systems and user applications can allocate VAS windows and dedicate them for send or receive. A VAS receive window can have a receive first-in-first-out (FIFO) buffer for incoming messages, and a VAS send window can be linked to its corresponding VAS receive window for high-speed communication.

These VAS windows facilitate highly efficient cross partition communication. Using a pair of VAS windows, one can send a message of 128 bytes from one virtual machine to the other in a high speed. In one aspect, however, the VAS windows are not considered as ordinary operating system (OS) resources. VAS send windows are not usually separated from VAS receive windows in different servers. If one virtual machine with one VAS window of a VAS window pair is moving or migrating, the other virtual machine may need to be moved or migrated for the VAS window pair to work in the target server, unless the target server can provide matched VAS windows. For example, in moving a virtual machine from one server to another, an inquiry can be made to determine if any VAS window has been allocated to the virtual machine and is currently in use. If so, a system may discover the properties of the VAS window and recreate them in the target server. A method, system, and/or technique, in embodiments, may discover endpoints such as VAS windows and/or recreate such endpoints in target server for virtual machine migration. A method, for example, may be integrated as, or in, a VAS window facility to discover VAS windows and their properties, so that, for example, they can be recreated in the target server for virtual machine migration. While the description herein may use VAS windows as examples of endpoints, the method, system and/or technique may apply other types of endpoints.

In embodiments, a method, for example, for virtual machine migration, may discover VAS windows and their properties in an original server, match VAS send windows with VAS receive windows, and then recreate the VAS windows and their relationships with their properties in a target server, for example, after the virtual machine migration.

To discover VAS windows and re-create them in a target server, a method in one embodiment may acquire VAS window properties, and create the same number of VAS windows with identical properties on the target server. For instance, the method may recreate VAS windows using the properties of all allocated VAS windows.

VAS windows are PHYP resources which are made available to logical partitions through hypervisor calls. A POWER9™ system can have multiple chips, and each chip can have a finite number of VAS windows, specified by a VAS window index. An allocated VAS window is given a local window identifier (ID), which starts at 0 in a logical partition. A global VAS window ID is defined as a chip index or ID concatenated with a VAS window index in a chip, for example, in POWER9™ server.

A system and/or method may include a set of hypervisor calls designed to form interfaces between a hypervisor, e.g., the PHYP, and its users. The hypervisor calls can be used to query a VAS window to find out its properties, to allocate a VAS window, to modify a VAS window with the desired properties, and to de-allocate a VAS window, for example, in a server system such as in a POWER9™ server. VAS windows provide a high-speed link for logical partitions to share data.

The H_QUERY_VAS_WINDOW hypervisor call queries a VAS window and displays all its properties. In some embodiments, all the associated register contents of the VAS window are shown and become available for reconstruction in the target server. For instance, the following property items can be shown or returned:
  VAS window type (send or receive),
  chip index indicating where the VAS window is allocated,
  global VAS window ID (for receive windows),
  global VAS window ID of corresponding/matched VAS receive window (for send windows),
  receive FIFO buffer size (for receive windows), and
  any other property used in H_ALLOCATE_VAS_WINDOW and H_MODIFY_VAS_WINDOW Hcalls.

The H_ALLOCATE_VAS_WINDOW hypervisor call allocates a VAS window. A chip index or ID is used to allocate a VAS window on a specific chip. VAS window type (e.g., send or receive) may be a parameter for this call to specify the type of window to be allocated. If no chip index of ID is specified, the VAS facility may choose a chip based on another information such as central processing unit (CPU) affinity. The chip index or ID helps distribute VAS windows evenly on a multiple-chip system. This hypervisor call can be also used to allocate VAS send windows with corresponding VAS receive windows in the same chip. Given the local window IDs and global window IDs of the allocated VAS windows in the original server, the method needs not preserve the local window IDs and/or the global window IDs in the target server. In some embodiment, the method preserves VAS window relationships, for example, VAS window pairs where send windows are allocated with corresponding receive windows in the same chip(s).

The H_MODIFY_VAS_WINDOW hypervisor call modifies a VAS window. For example, this hypervisor call is used to add a receive FIFO buffer of a size to a VAS receive window, and to specify the corresponding VAS receive window index for a VAS send window. The hypervisor call can also be used to provide report enable control for individual VAS receive windows. In some embodiments, if the report enable bit is set, there is no automatic notify for the received message at the receiver side and the report enable bit in the paste command is used for notification. For VAS receive window, the hypervisor call can take the following inputs: receive FIFO address; and receive FIFO size. For VAS send window, the hypervisor call can take the following input: VAS window index or ID of the corresponding VAS receive window. The hypervisor can make physical connection between the send and receive windows of the same chip or integrated circuit (IC) module.

The H_DEALLOCATE_VAS_WINDOW hypervisor call de-allocates a VAS window. This hypervisor call can be used, for example, to de-allocate VAS windows which are allocated but currently not in use, and VAS windows whose matched send or receive windows are not found. Although this hypervisor call need not be used directly for discovery or recreation of VAS windows, this hypervisor call can be used for VAS window life-cycle management. This hypervisor call can be used to de-allocate VAS windows in the virtual machines to be migrated, for example, before virtual machine migration, and also to de-allocate matched VAS windows in the VIOS of the source server, for example, before virtual machine migration. In some embodiments, local VAS window IDs and global VAS window IDs need not be preserved after virtual machine migration.

FIG. 1 is a diagram illustrating a state transition diagram of a VAS window and the associated hypervisor calls causing the transitions in one embodiment. A VAS window is originally at its "Deallocated" (e.g., not in use) state 102. The state of the VAS window changes to "Allocated" 104 after a successful H_ALLOCATE_VAS_WINDOW hypervisor call. The VAS window can be modified through the H_MODIFY_VAS_WINDOW hypervisor call, and its state changes to "Open" for normal operations 106. To de-allocate VAS windows, the H_DEALLOCATE_VAS_WINDOW hypervisor call can be used.

Figure 2:
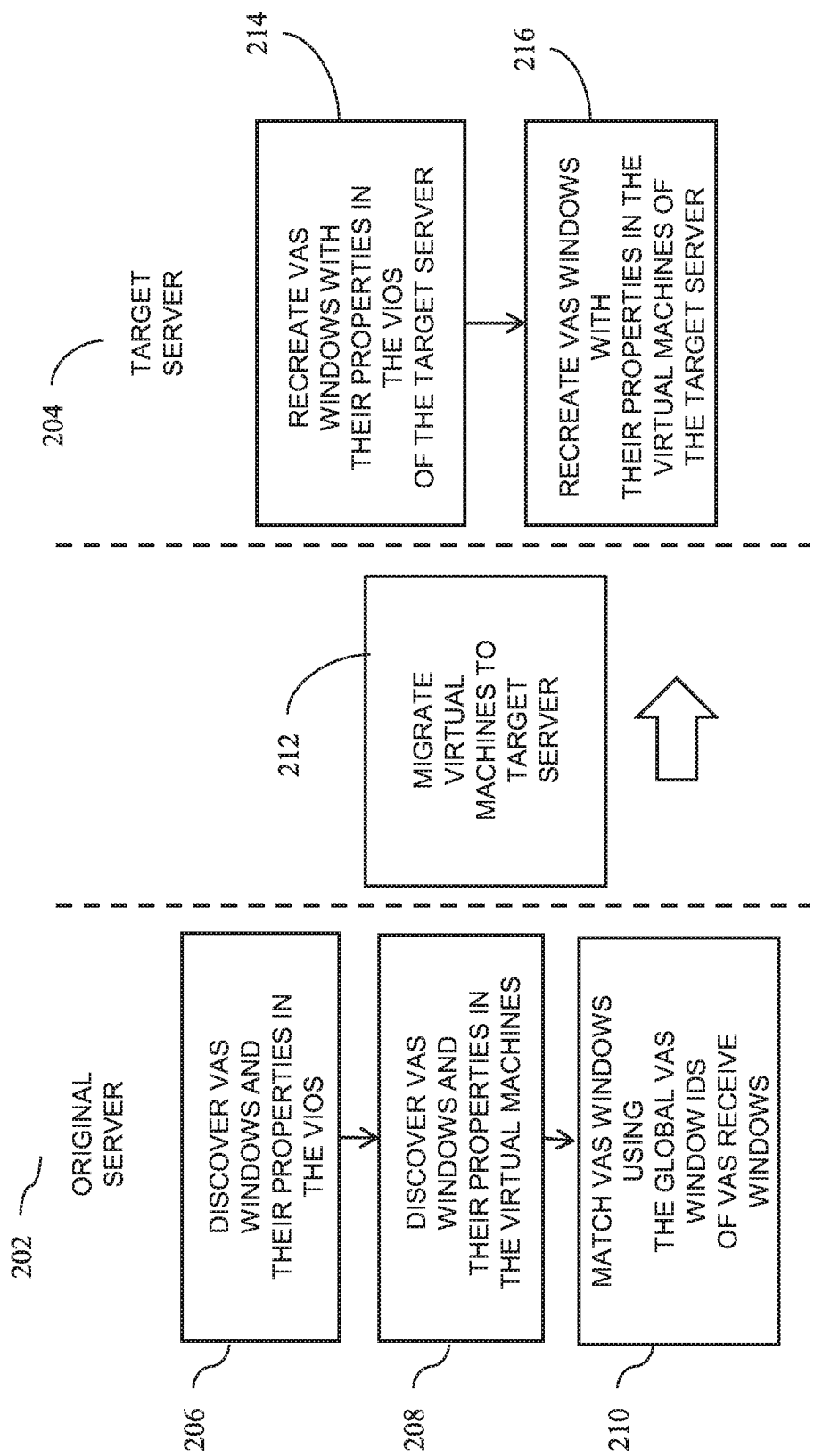
FIG. 2 illustrates a flow of a method which may discover and match VAS windows in a server and recreate the windows in another server in one embodiment.

FIG. 2 illustrates a flow of a method which may discover and match VAS windows in a server (original server) and recreate the windows in another server (target server), for example, after VM migration, in one embodiment. Original server 202 can be a source server from which a virtual machine (VM) is to be migrated. Target server 204 can be a server to which the virtual machine (VM) is migrated.

The method in some embodiments may include using (e.g., issuing or invoking) the H_QUERY_VAS_WINDOW hypervisor call to query VAS windows, for example, in both a Virtual I/O Server (VIOS) and one or more virtual machines (e.g., VIOS clients) of the original server 202. Virtual I/O (VIO) server is a virtualization technology from IBM®. The call returns or reports the properties of a VAS window, such as VAS window type (send or receive), global VAS window ID, receive FIFO buffer size (for receive windows), etc. The method in some embodiments use one or more global VAS window IDs of VAS receive windows to match one or more VAS send windows with one or more VAS receive windows. For example, at 206 the method may discover one or more VAS windows and their properties in the VIOS. At 208, the method may discover one or more VAS windows and their properties in one or more virtual machines. At 210, the method may match VAS windows using the one or more global VAS window IDs of one or more VAS receive windows. Briefly, the VIOS facilitates the sharing of physical I/O resources between client logical partitions within a server.

The block at 212 shows migrating one or more virtual machines to the target server 204. In some embodiments, after the one or more virtual machines have been migrated to the target server 204, VAS windows are recreated in both the VIOS and the virtual machines in the target server 204 using the H_ALLOCATE_VAS_WINDOW and H_MODIFY_VAS_WINDOW hypervisor calls. For example, at 214, a method may include recreating one or more VAS windows with their properties in the VIOS of the target server 204. At 216, the method may include recreating one or more VAS windows with their properties in one or more virtual machines migrated to the target server 204.

Figure 3:
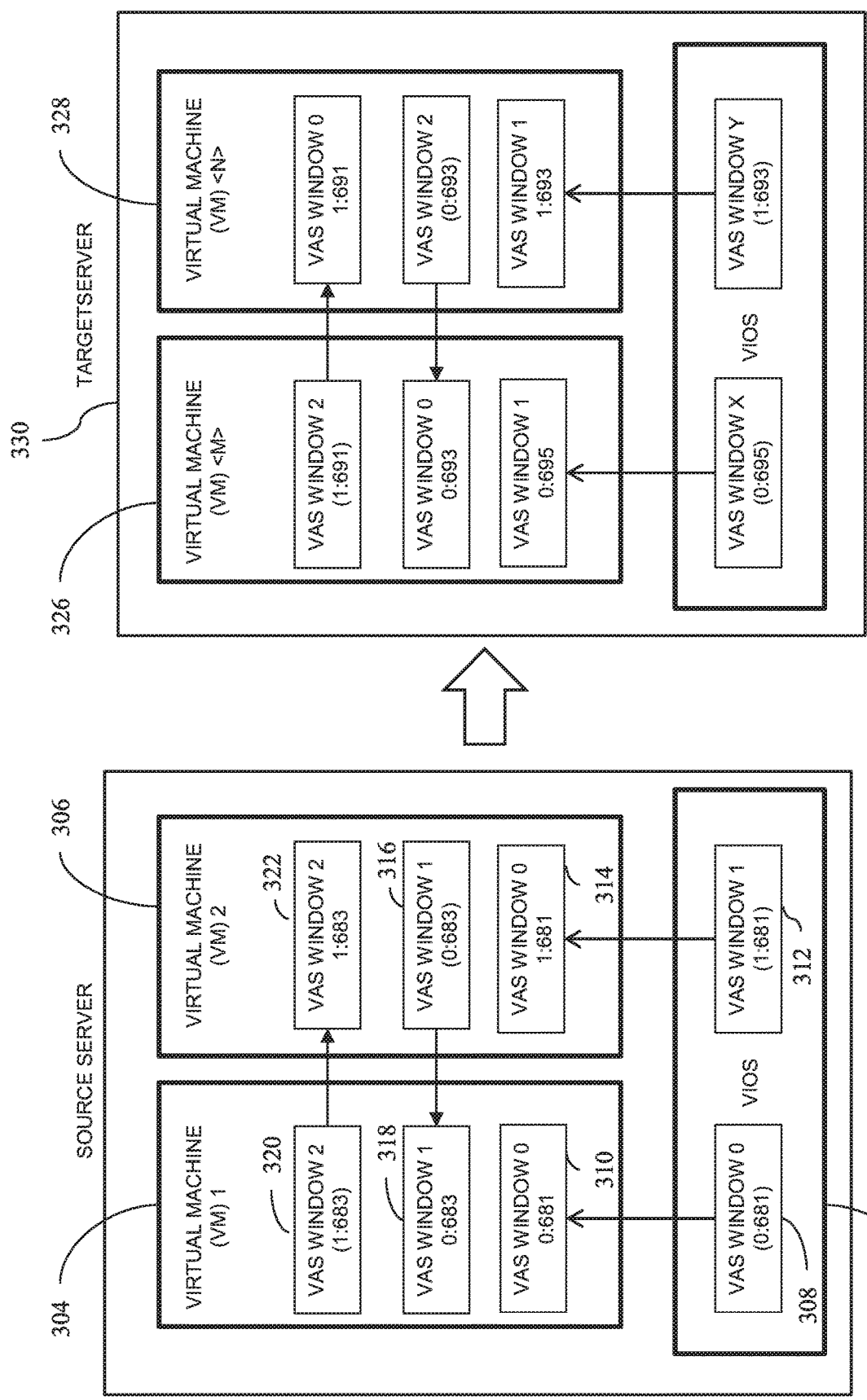
FIG. 3 is a diagram illustrating moving VAS windows from a source server to a target server in one embodiment.

FIG. 3 is a diagram illustrating moving VAS windows from a source server to a target server in one embodiment. A global VAS window ID in parenthesis indicates a VAS send window, which points to a receive window whose global ID is the value indicated in the parenthesis. In some embodiments, a VIOS need not be migrated, VIO-client virtual machines are migrated. In some embodiments, VIOS exists on a target server. FIG. 3 illustrates an example of moving two virtual machines from the original server to the target server. The method and system, however, is not limited to only 2 virtual machines. Rather, the method and system may operate with any number of virtual machines. A Virtual I/O server (VIOS) 302 provides virtualized storage and network connectivity for its clients. The virtual machines 304, 306 may or may not be VIOS clients. There are 4 pairs of VAS windows in the original server: two pairs between the VIOS and the virtual machines and two pairs between the two virtual machines. A pair 308, 310 exists between the VIOS 302 and a virtual machine 304; another pair 312, 314 exists between the VIOS 302 and a virtual machine 306. A pair 316, 318 exists between the virtual machine 306 and the virtual machine 304; another pair 320, 322 exists between the virtual machine 304 and the virtual machine 306. Each pair of VAS windows is identified by a global VAS window ID of a VAS receive window, e.g., 0:681, where 0 is a chip ID and 681 is a VAS window index in the chip. A VAS window with a global VAS window ID in a parenthesis indicates that the VAS window is a VAS send window. The global VAS window ID of a VAS send window is not shown. The global VAS window ID of a VAS send window need not be used to match VAS send windows with corresponding VAS receive windows. In some embodiments, local VAS window IDs and/or global VAS window IDs need not be preserved after the migration, for example, as shown in FIG. 3. In some embodiments, the method preserves the properties of the VAS window pairs and their send/receive relationships. After being migrated, VM1 304 and VM2 306 become VM<m> 326 and VM<n> 328 in the target server 330.

Figure 4:
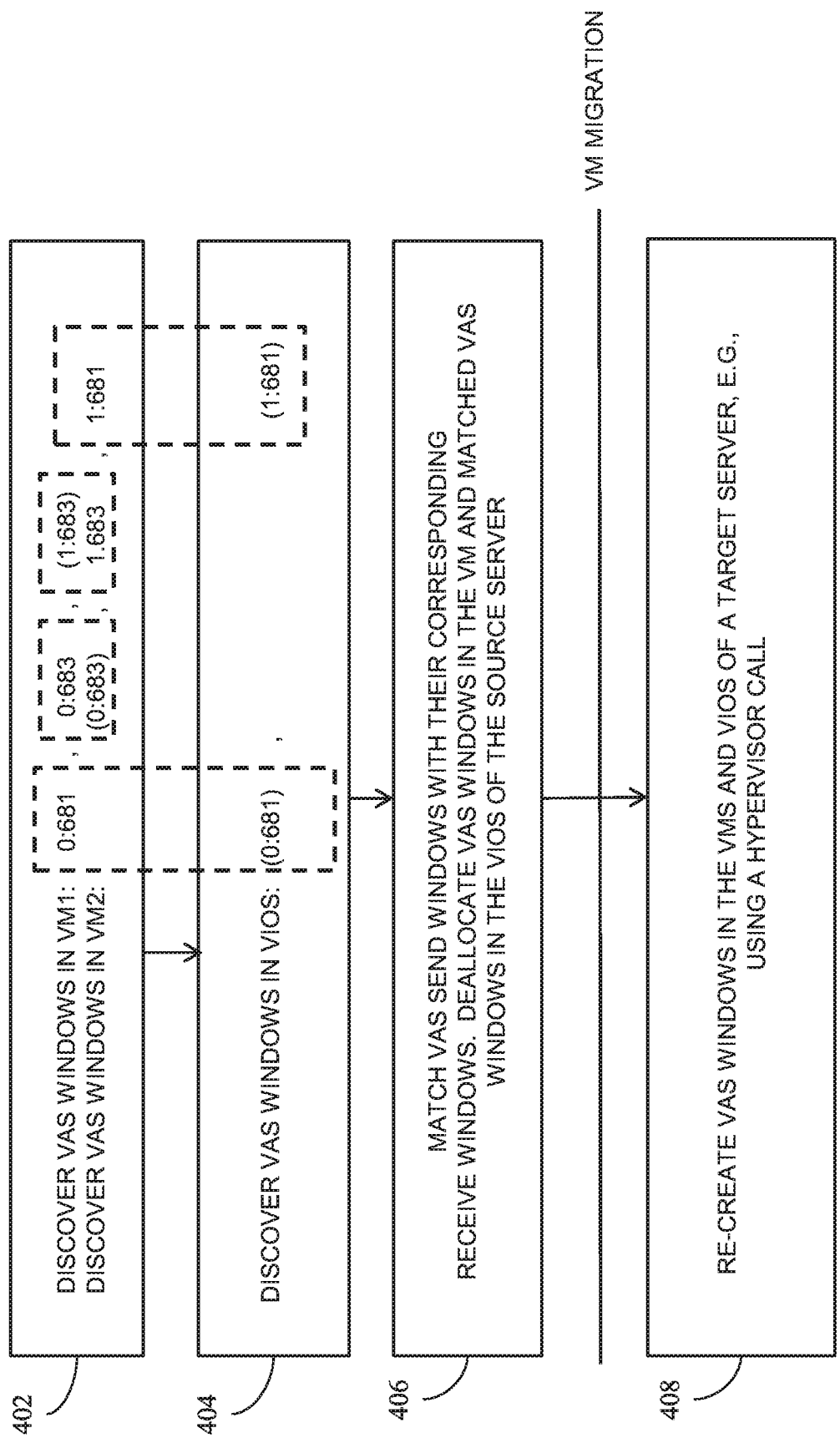
FIG. 4 is a flow diagram illustrating a method which can discover and match VAS windows in the source server, and to re-create VAS windows a target server in one embodiment.

FIG. 4 is a flow diagram illustrating a method which can discover and match VAS windows in the source server, and to re-create them in the target server after VM migration, in one embodiment. In one embodiment, the method includes using or invoking a H_QUERY_VAS_WINDOW hypervisor call to acquire the properties of the VAS windows. Once the VAS windows are found in VM1, VM2, and/or VIOS of the source server, the method uses the global VAS window IDs to match VAS send windows with their corresponding VAS receive windows. For example, at 402, the method includes discovering VAS windows in virtual machines of a source server (e.g., 0:681, 0:683, 1:683 in VM1 and 0:683, 1:683 and 1:681 in VM2 in the example configuration shown in FIG. 3). At 404, the method includes discovering VAS windows in VIOS (e.g., 0:681 and 1:681 in the example configuration shown in FIG. 3).

At 406, VAS send windows are matched with their corresponding receive windows, shown in dashed rectangles. In one embodiment, the method may also de-allocate VAS windows in the virtual machines and matched VAS windows in the VIOS of the source server.

Virtual machine migration may take place after the VAS windows have been matched and de-allocated in the source server.

At 408, VAS windows may be re-created in VMs and VIOS of a target server to which the VMs have been migrated. In some embodiments, to recreate VAS windows in the target server after virtual machine migration, the method may use the H_ALLOCATE_VAS_WINDOW and H_MODIFY_VAS_WINDOW hypervisor calls. Assuming that VM1 and VM2 becomes VM<m> and VM<n> in the target server, the method in some embodiments use the following pseudo code to illustrate how the VAS windows are re-created in the target server.

Re-create VAS Receive Windows in VM<m>:
VM<m>: H_ALLOCATE_VAS_WINDOW chipID=0, windowType=recv
Window 0 allocated with window index 693
VM<m>: H_MODIFY_VAS_WINDOW window=0, FIFO_Addr=<addr_m0>, FIFO_Size=<Size_m0>

VM<m>: H_ALLOCATE_VAS_WINDOW chipID=0, windowType=recv
  Window 1 allocated with window index 695
  VM<m>: H_MODIFY_VAS_WINDOW window=1, FIFO_Addr=<addr_m1>, FIFO_Size=<Size_m1>
Re-create VAS Receive Windows in VM<n>:
  VM<n>: H_ALLOCATE_VAS_WINDOW chipID=1, windowType=recv
  Window 0 allocated with window index 691
  VM<n>: H_MODIFY_VAS_WINDOW window=0, FIFO_Addr=<addr_n0>, FIFO_Size=<Size_n0>
  VM<n>: H_ALLOCATE_VAS_WINDOW chipID=1, windowType=recv
  Window 1 allocated with window index 693
  VM<n>: H_MODIFY_VAS_WINDOW window=1, FIFO_Addr=<addr_n1>, FIFO_Size=<Size_n1>
Re-create VAS Send Windows in VM<m> and VM<n>:
  VM<m>: H_ALLOCATE_VAS_WINDOW chipID=1, windowType=send
  Window 2 allocated with window index <index_m2>
  VM<m>: H_MODIFY_VAS_WINDOW window=2, recvWindowIndex=691
  VM<n>: H_ALLOCATE_VAS_WINDOW chipID=0, windowType=send
  Window 2 allocated with window index <index_n2>
  VM<n>: H_MODIFY_VAS_WINDOW window=2, recvWindowIndex=693
Re-create VAS Send Windows in VIOS:
  VIOS: H_ALLOCATE_VAS_WINDOW chipID=0, windowType=send
  Window x allocated with window index <index_x>
  VIOS: H_MODIFY_VAS_WINDOW window=x, recvWindowIndex=695
  VIOS: H_ALLOCATE_VAS_WINDOW chipID=1, windowType=send
  Window y allocated with window index <index_y>
  VIOS: H_MODIFY_VAS_WINDOW window=y, recvWindowIndex=693

In some embodiments, VAS send windows and their corresponding VAS receive windows are allocated in the same chip. In some embodiments, the order of recreating windows (allocating receive and send windows) can vary, and need not be done in the order shown in the above example.

Figure 5:
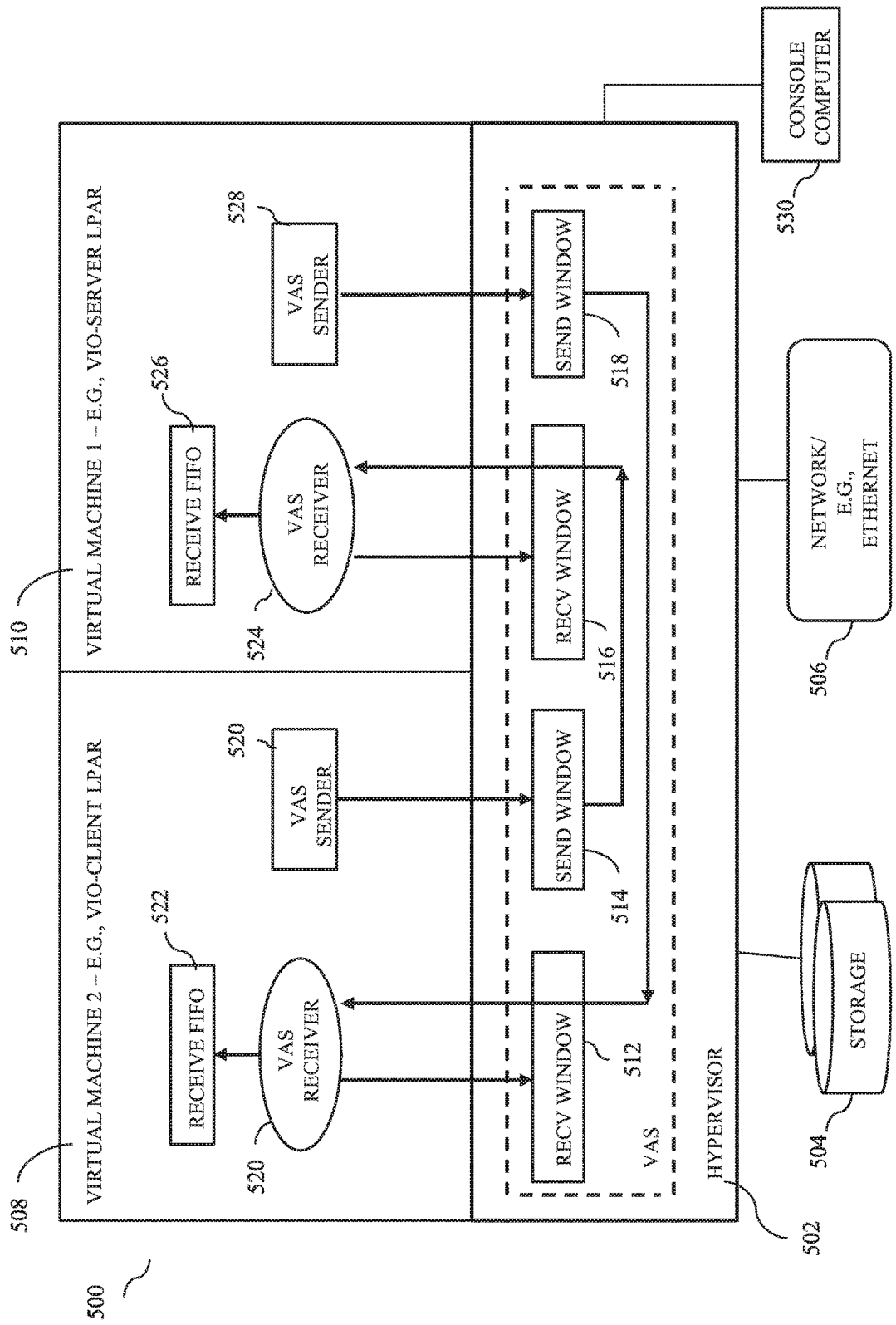
FIG. 5 is a flow diagram illustrating a method in one embodiment.

FIG. 5 is a diagram illustrating VAS windows and hardware channel across virtual machines in one embodiment. Configuration shown at 500 can be a physical system host. A hypervisor 502 manages sharing of system resources such as a central processing unit (CPU), random access memory (RAM), storage 504, and network 506. Multiple virtual machines 508, 510 (e.g., guest logical partition (LPAR)) can host client applications. In some embodiments, special virtual machines (VIOS) may render virtualized input/output (I/O) services (e.g., storage and network) dynamically to the guest LPARs. For example, virtual I/O servers can allow sharing of physical I/O resources between virtual I/O clients. The I/O virtualization via VIOS can involve inter-partition communication. The hypervisor can provide a number of VAS windows 512, 514, 516, 518, which facilitate send and receive operations. For example, operating systems and user applications can allocate VAS windows and dedicate them for send or receive. In a virtual machine 508, a VAS receive window 512 via a VAS receiver 520 can have a receive first-in-first-out (FIFO) buffer 522 for incoming messages. A VAS send window 514 can be linked to its corresponding VAS receive window 516 for high-speed communication. A VAS sender 520 can send a message to a send window 514.

Similarly, in a virtual machine 510, a VAS receive window 516 via a VAS receiver 524 can have a receive first-in-first-out (FIFO) buffer 526 for incoming messages. A VAS send window 518 can be linked to its corresponding VAS receive window 512 for high-speed communication. A VAS sender 528 can send a message to a send window 518. This type of window allocation scheme can facilitate cross partition (e.g., 508, 510) communication. For example, using a pair of VAS windows 512, 518, a virtual machine 510 can send a message, e.g., of 128 bytes, to a virtual machine 508. Similarly, using a pair of VAS windows 514, 516, a virtual machine 508 can send a message, e.g., of 128 bytes, to a virtual machine 510. One or more computers or computer processors (e.g., a console) 530 may be coupled with a system 500 that can perform management of the system 500, such as hardware management. Such as console 530 may include a firmware capable of providing platform configuration and management services, for example, supporting diagnostics, error detection, configuration, power monitoring and management, and/or others.

Figure 6:
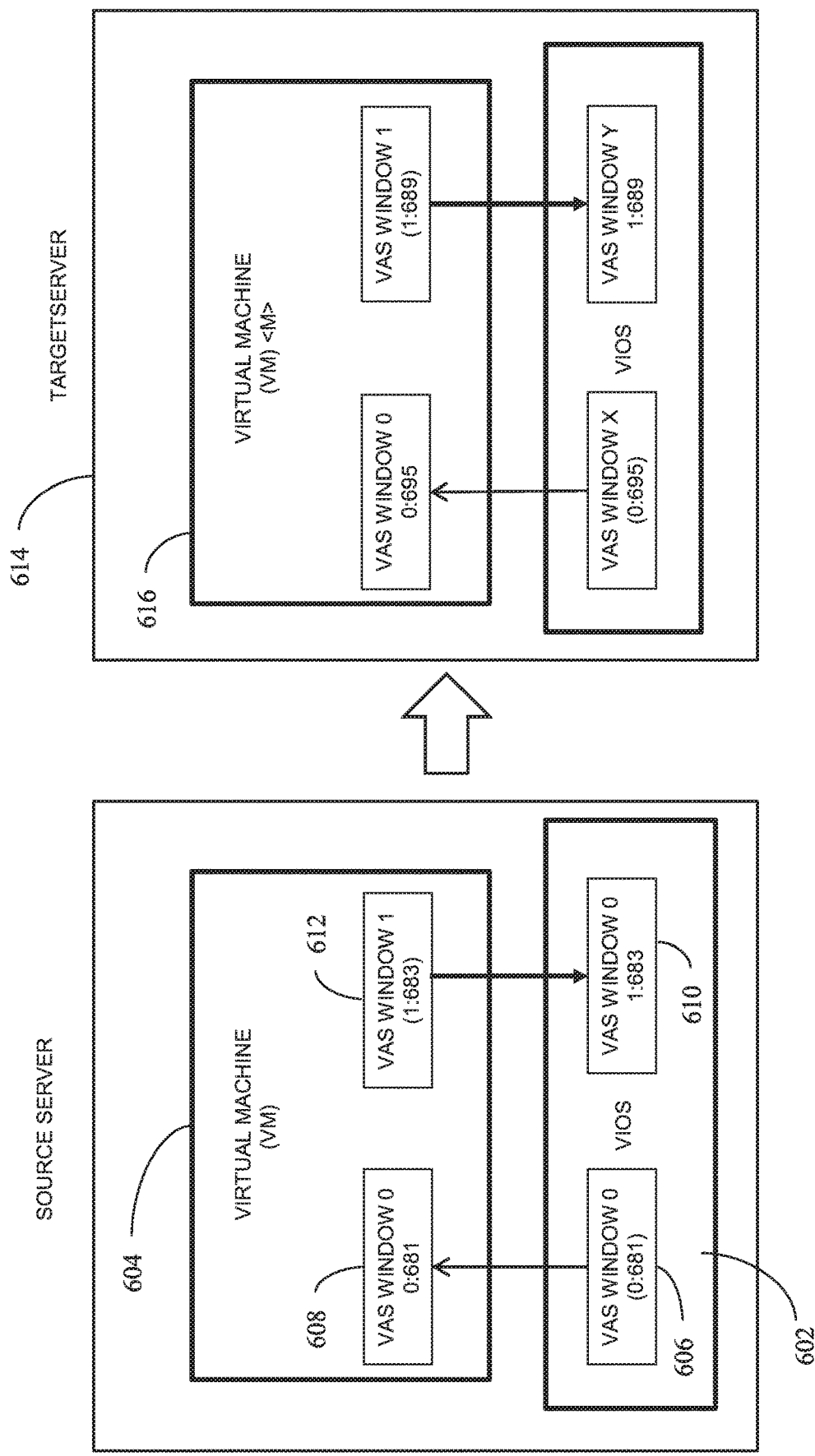
FIG. 6 is a diagram illustrating a moving of a virtual machine with endpoints from a server to another server in one embodiment.

FIG. 6 is a diagram illustrating a moving of a virtual machine with endpoints from one server to another server in one embodiment. An example of an endpoint is a VAS window. A parenthesized item indicates that the enclosing rectangle is a send window that points to a receive window whose global ID is the value inside the parentheses. In one embodiment, a VIOS need not be migrated, for example, since VIOS can exist on a target server. VIOS client (e.g., a virtual machine) 604 is migrated. A Virtual I/O server (VIOS) 602 can provide virtualized storage and network connectivity for its clients. The virtual machine 604 can be a VIOS client. There are two pairs of VAS windows in the original server, between the VIOS 602 and the virtual machine 602. A pair 606, 608 exists between the VIOS 602 and the virtual machine 604; another pair 610, 612 exists between the VIOS 602 and the virtual machine 604. Each pair of VAS windows is identified by a global VAS window ID of a VAS receive window, e.g., 0:681, where 0 is a chip ID and 681 is a VAS window index in the chip. A VAS window with a global VAS window ID in a parenthesis indicates that the VAS window is a VAS send window. The global VAS window ID of a VAS send window is not shown. The global VAS window ID of a VAS send window need not be used to match VAS send windows with corresponding VAS receive windows. In some embodiments, local VAS window IDs and/or global VAS window IDs need not be preserved after the migration, for example, as shown in FIG. 6. In some embodiments, the method preserves the properties of the VAS window pairs and their send/receive relationships. After migration, the virtual machine 604 becomes a virtual machine <m> 616 in the target server 614.

Figure 7:
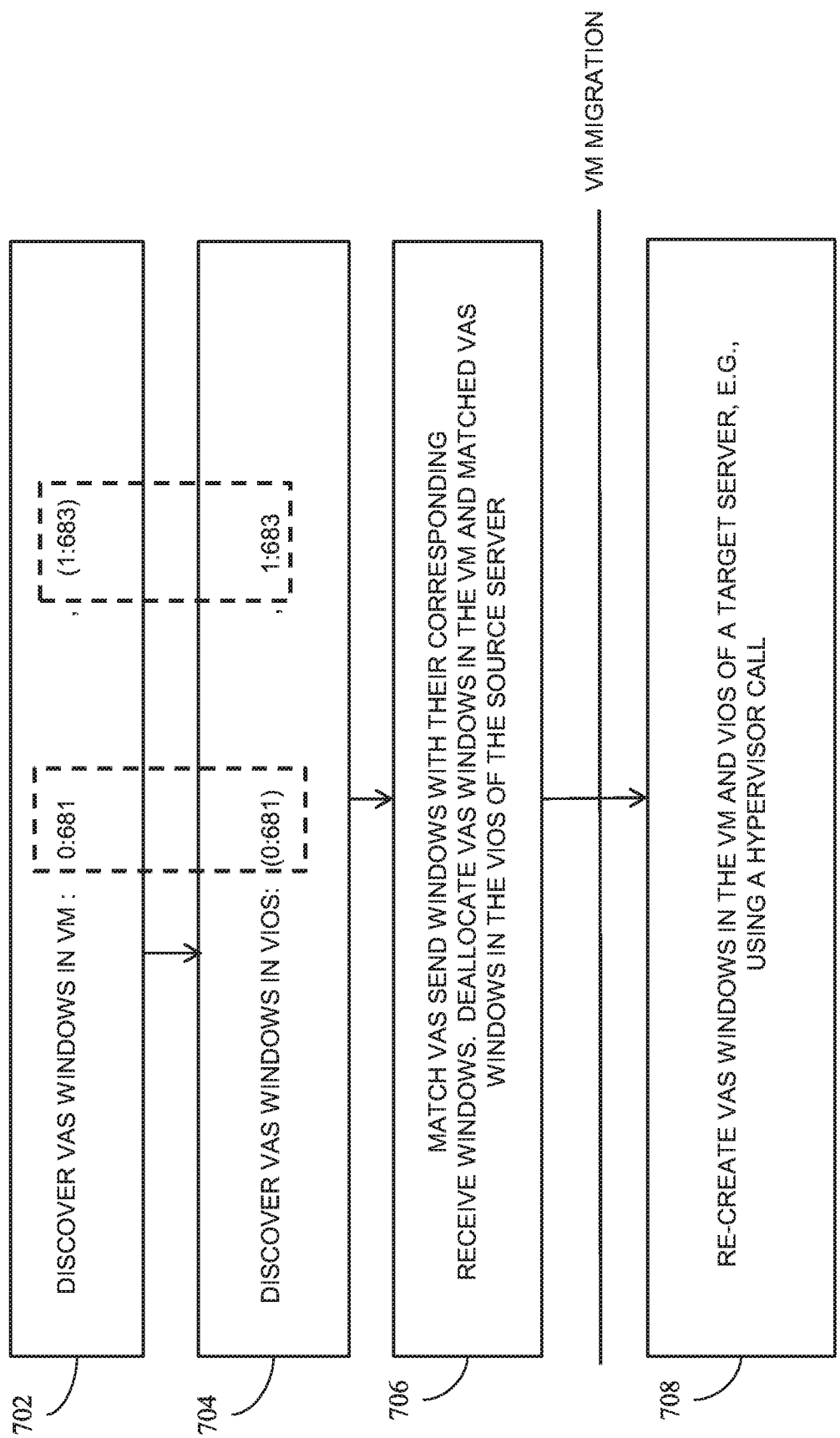
FIG. 7 is a diagram illustrating a method which can discover and match endpoints in a server and recreating the endpoints in another server in one embodiment.

FIG. 7 is a diagram illustrating a method which can discover and match endpoints in a source server and recreating the endpoints in a target server in one embodiment. In one embodiment, the method includes using or invoking a hypervisor call such as a H_QUERY_VAS_WINDOW hypervisor call to acquire the properties of the VAS windows. Once the VAS windows are found, for example, in a virtual machine and/or a VIOS of the source server, the method uses the global VAS window IDs to match VAS send windows with their corresponding VAS receive windows. For example, at 702, the method includes discovering VAS windows in a virtual machine of a source server (e.g., 0:681, 1:683 in VM in the example configuration shown in FIG. 6). At 704, the method includes discovering VAS windows in VIOS (e.g., 0.681 and 1.683 in the example configuration shown in FIG. 3).

At 706, VAS send windows are matched with their corresponding receive windows, shown in dashed rectangles. In one embodiment, the method may also de-allocate VAS windows in the virtual machine and matched VAS windows in the VIOS of the source server.

Virtual machine migration may take place. For instance, a method in one embodiment may initiate a migration.

At 708, VAS windows may be re-created in the migrated VM and VIOS of a target server to which the VM has been migrated. In some embodiments, to recreate VAS windows in the target server after virtual machine migration, the method may use hypervisor calls, e.g., the H_ALLOCATE_VAS_WINDOW and H_MODIFY_VAS_WINDOW hypervisor calls. Considering the notation that VM in the source server becomes VM<m> in the target server, the method in some embodiments use the following pseudo code to illustrate how the VAS windows are re-created in the target server.

Re-create VAS Receive Windows:
VM<m>: H_ALLOCATE_VAS_WINDOW chipID=0, windowType=recv
  Window 0 allocated with window index 695
VM<m>: H_MODIFY_VAS_WINDOW window=0, FIFO_Addr=<addr_0>, FIFO_Size=<size_0>
VIOS: H_ALLOCATE_VAS_WINDOW chipID=0, windowType=recv window <x> allocated with window index 689
VIOS: H_MODIFY_VAS_WINDOW window=<x>, FIFO_Addr=<addr_x>, FIFO_Size=<size_x>
Re-create VAS Send Windows:
VM<m>: H_ALLOCATE_VAS_WINDOW chipID=1, windowType=send
  window 1 allocated with window index <index 1>
VM<m>: H_MODIFY_VAS_WINDOW window=1, recvWindowIndex=689
VIOS: H_ALLOCATE_VAS_WINDOW chipID=0, windowType=send
  window <y> allocated with window index <index_y>
VIOS: H_MODIFY_VAS_WINDOW window=<y> recvWindowIndex=695

In some embodiments, VAS send windows and their corresponding VAS receive windows are allocated in the same chip. In some embodiments, the order of recreating windows (allocating receive and send windows) can vary, and need not be done in the order shown in the above example.

Figure 8:
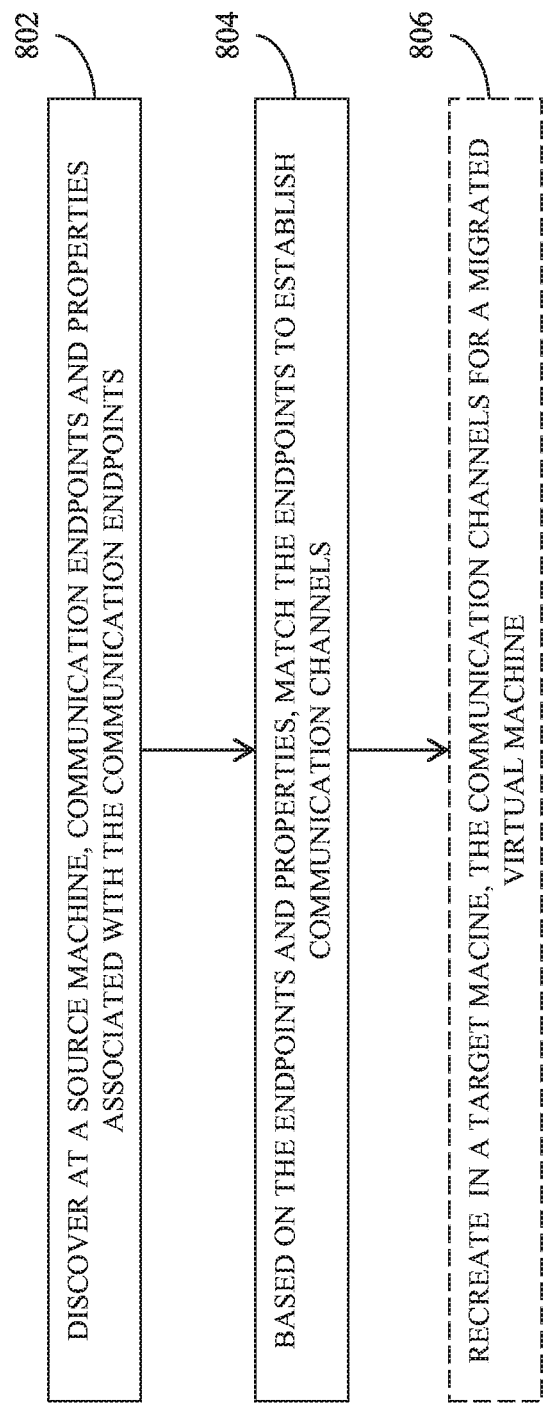
FIG. 8 is a flow diagram illustrating a method in one embodiment, which can discover and/or recreate communication endpoints in virtual machine migration.

In some embodiments, the method can be applicable to other communication entities, not limited to VAS windows. FIG. 8 is a flow diagram illustrating a method in one embodiment, which can discover and/or recreate communication endpoints in virtual machine migration. One or more hardware processors can perform the method. The method in some embodiments can discover and/or recreate communication endpoints for hardware accelerators in virtual machine migration. For instance, the method may handle migrating related virtual machines from one machine (source machine) to another (target machine). The method in some embodiments can discover communication endpoints created in a hypervisor on a source machine to allow communications between virtual machines hosted by the hypervisor. Responsive to a virtual machine being migrated, one or more endpoints used in communications by the virtual machine can be recreated in a target machine. For instance, communication endpoints can be created in a hypervisor on the target machine to establish the communication between the one or more virtual machines that are being migrated. The method can preserve the functionalities of the communication end-point in recreating the endpoints in a target machine.

In some embodiments, a system and/or method for discovery and re-creation of communication endpoints in virtual machine migration preserve the communication channels between the endpoints of one or more virtual machines. A communication channel refers to a pair of communication endpoints. Referring to FIG. 8, at 802, discovering at a source machine, communication endpoints and properties associated with the communication endpoints by interrogating or querying a virtual machine associated with the source machine. In some embodiments, a virtual machine that is interrogated can be a virtual I/O server, which can be a logical partition. So for example, at the source machine or server, a processor executing the method may discover the communication endpoints and their properties by interrogating both the virtual I/O server (VIOS) and each virtual machine (VM) to be migrated.

A communication endpoint can be a send endpoint. A communication endpoint can be a receive endpoint. In some embodiments, the send endpoint and a receive endpoint can be combined to form a communication channel between virtual machines. In another example, the send endpoint and a receive endpoint can be combined to form a communication channel between a virtual machine and its virtual I/O server (VIOS).

The interrogating may query one or more local endpoints in one or more virtual machines and in a virtual I/O server, to collect information about a collection of endpoints. This interrogating or querying may include converting one or more endpoint IDs that are local to a virtual machine and/or VIOS to global endpoint IDs in the scope of the source server, and acquiring properties of the one or more endpoints. The interrogating may also include obtaining global endpoint IDs of corresponding receive endpoints for the send endpoints. The properties collected for an endpoint may include endpoint type (e.g., send or receive), global ID, receive FIFO buffer size and address for a receive endpoint, and global ID of the corresponding receive endpoint for a send endpoint.

At 804, the method may include, based on the endpoints and properties discovered at 802, matching the endpoints to establish communication channels. For instance, matching can match or correlate a send endpoint with a receive endpoint. The established communication channels can be recreated in a migrated version of the virtual machine, including the properties. In some embodiments, unmatched endpoints, which are not in "open" state, e.g., not active for service and not connected to any other endpoints to form communication channels, can be matched.

For example, at 806, at a target machine, the communication channels can be recreated for the migrated virtual machine on the target server, including at least some of the properties. Recreating the communication channels may include recreating the endpoints associated with the virtual machine in a migrated virtual machine in a target server. Recreating may further include recreating the matched endpoints of the VIOS associated with the source server in the VIOS associated with the target server. Recreating may further include recreating the communication channels between one or more migrated virtual machines, for example, if any, and between a migrated virtual machine and its VIOS in the target server. The method may use the properties associated with the endpoints to recreate the endpoints and the communication channels in the target server.

In some embodiments, a set of tools or hypervisor calls are provided and the method may use or invoke one or more of the hypervisor calls to manage the endpoints. One or more of the hypervisor calls provide functionalities to obtain the properties of the endpoints, to allocate the endpoints, to modify the endpoints, and to release the endpoints.

In some embodiments, a system for discovery and recreation of communication endpoints in virtual machine migration may include one or more hardware processors which can discover a collection of communication endpoints associated with one or more virtual machines in a source server or machine. A communication endpoint can be a send endpoint or a receive endpoint. One or more hardware processors may also discover a collection of communication channels one or more virtual machines in the source server use to communicate with one another and/or with the VIOS in the source server. A communication channel refers to a pair of endpoints. The system in one embodiment preserves the communication channels, for example, a logical connection between partitions. A communication channel can connect two partitions. Each communication channel can be composed of a send endpoint and a receive endpoint. One or more hardware processors may use (e.g., invoke) a set of tools or hypervisor calls to manage the endpoints, such as to provide the functionalities to acquire the properties of the endpoints, to release the endpoints, to allocate the endpoints, and to modify the endpoints. One or more hardware processors may find one or more endpoints in one or more virtual machines and one or more endpoints in the VIOS of the source server, match the endpoints to establish the communication channels, and recreate the communication channels for the migrated VMs on the target server.

Figure 9:
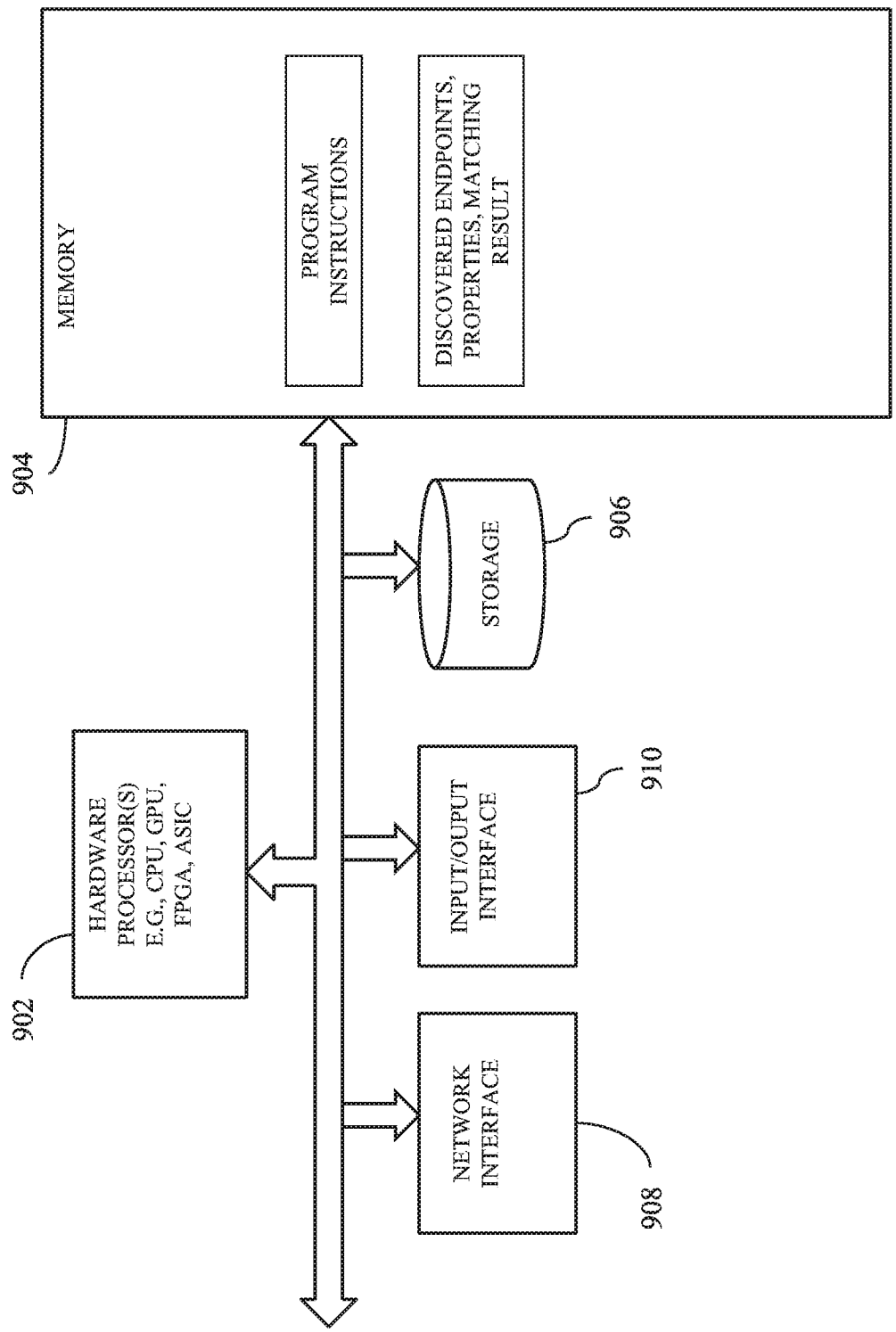
FIG. 9 is a diagram showing components of a system in one embodiment, which can discover and/or recreate communication endpoints in virtual machine migration.

FIG. 9 is a diagram showing components of a system in one embodiment, which can discover and/or recreate communication endpoints in virtual machine migration. One or more hardware processors 902 such as a central processing unit (CPU), a graphic process unit (GPU), and/or a Field Programmable Gate Array (FPGA), an application specific integrated circuit (ASIC), and/or another processor, may be coupled with a memory device 904, and invoke one or more function calls such as hypervisor calls to discover communication endpoints in one or more virtual machines and match the endpoints. A memory device 904 may include random access memory (RAM), read-only memory (ROM) or another memory device, and may store data and/or processor instructions for implementing various functionalities associated with the methods and/or systems described herein. One or more processors 902 may execute computer instructions stored in memory 904 or received from another computer device or medium. A memory device 904 may, for example, store instructions and/or data for functioning of one or more hardware processors 902, and may include an operating system and other program of instructions and/or data. In some embodiments, discovered endpoints, associated properties, and a result of matching endpoints (e.g., relationships between endpoints) can be stored in a storage device 606 or received via a network interface 908 from a remote device, and may be temporarily loaded into a memory device 904, for example, for use in recreating one or more communication channels for a migrated virtual machine. One or more hardware processors 902 may be coupled with interface devices such as a network interface 908 for communicating with remote systems, for example, via a network, and an input/output interface 910 for communicating with input and/or output devices such as a keyboard, mouse, display, and/or others.

Figure 10:
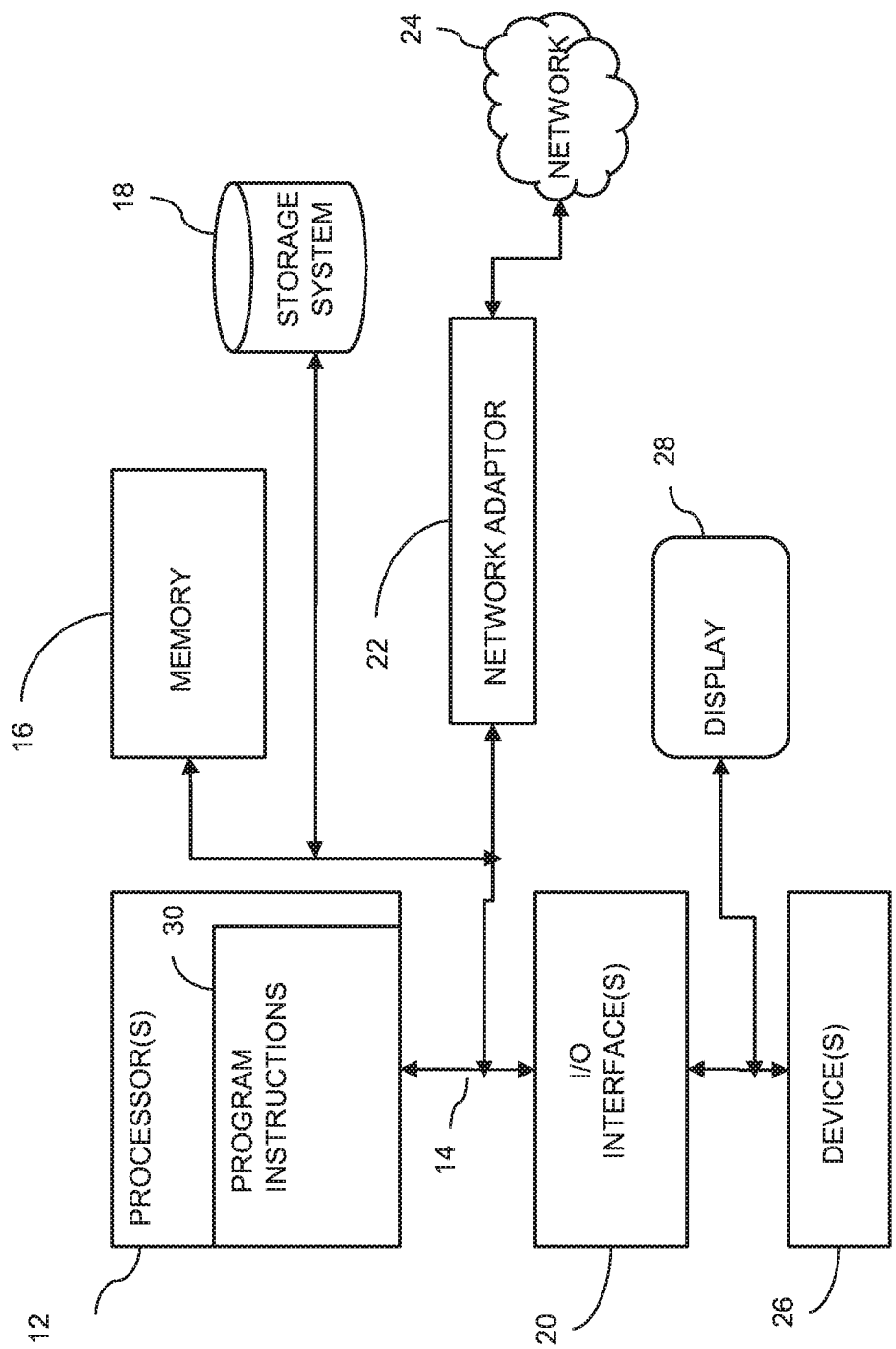
FIG. 10 illustrates a schematic of an example computer or processing system that may implement a system according to one embodiment.

FIG. 10 illustrates a schematic of an example computer or processing system that may implement a communication channel discovery and/or recreation system for virtual machine migration in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
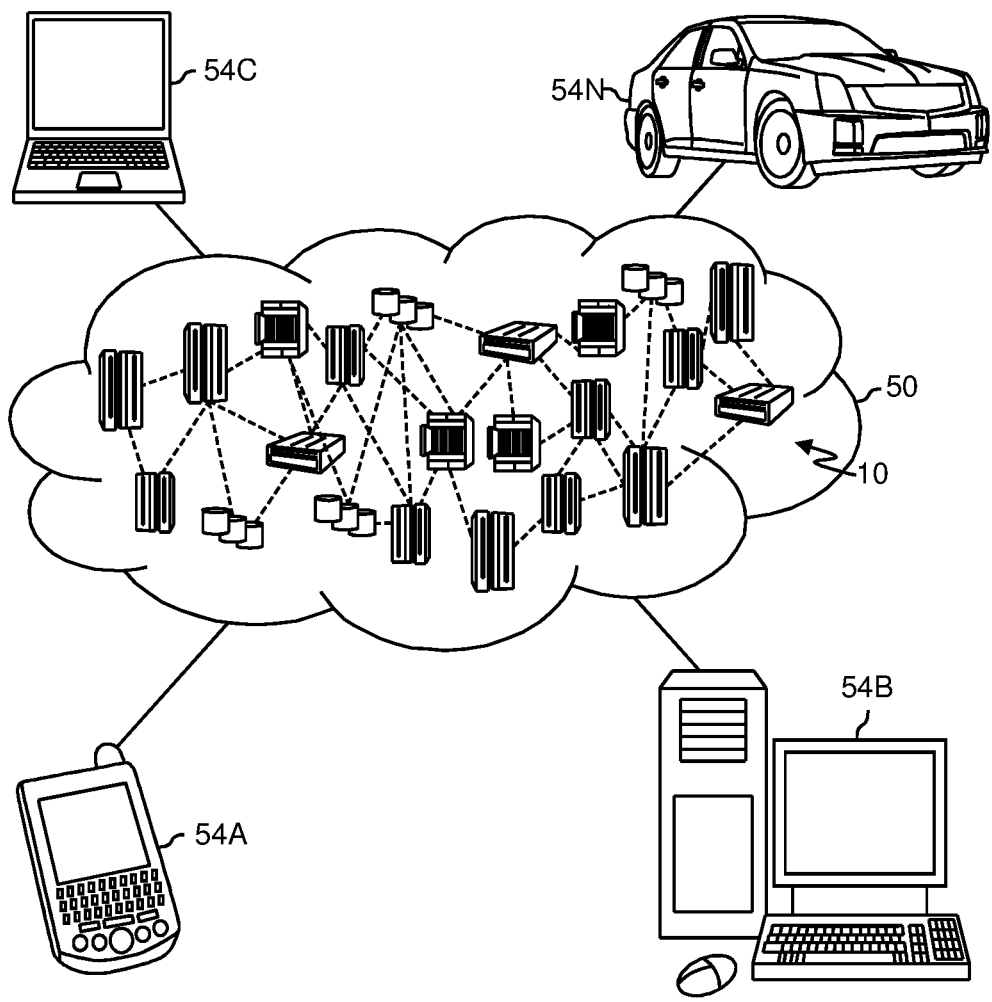
FIG. 11 illustrates a cloud computing environment in one embodiment.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
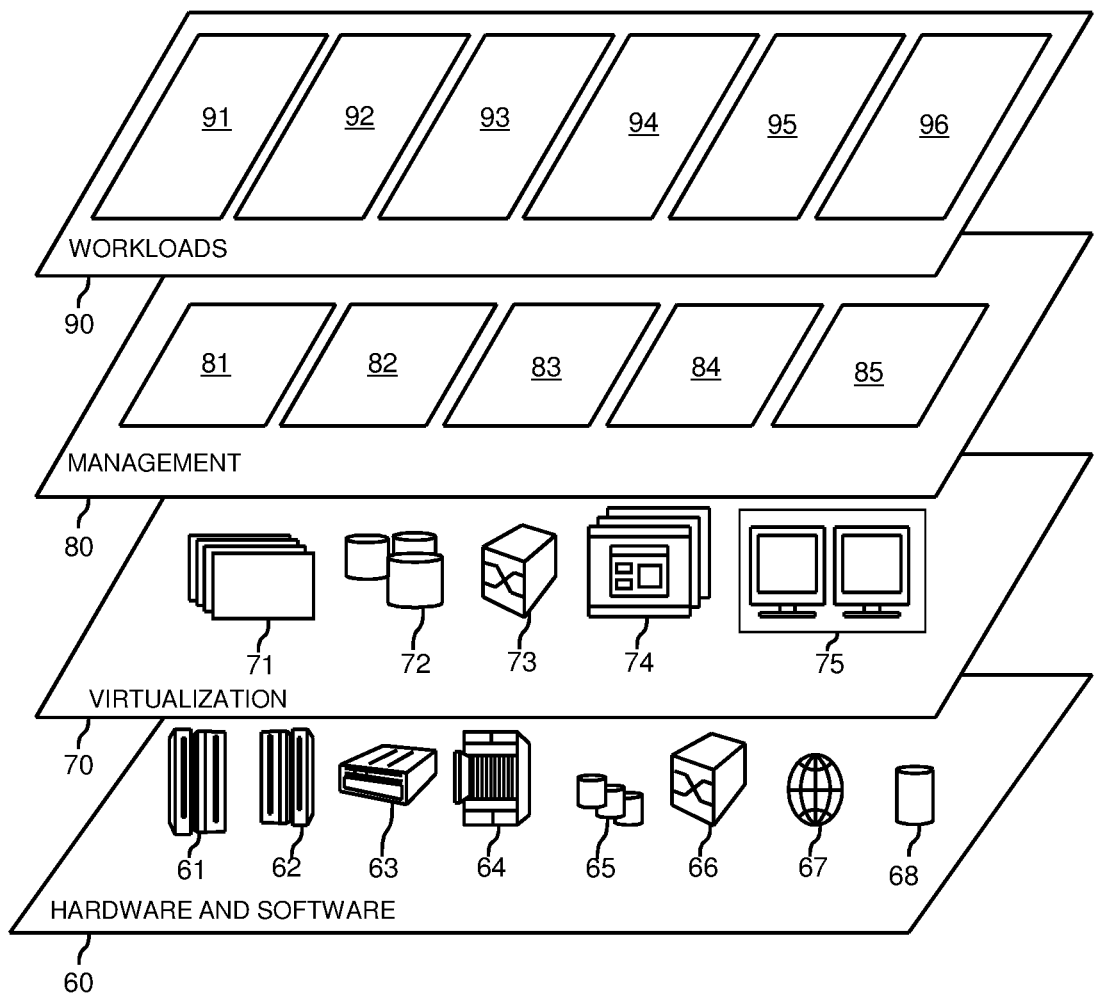
FIG. 12 illustrates a set of functional abstraction layers provided by cloud computing environment in one embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In some embodiments, aspects of discovery and/or recreation in virtual machine migration processing may be provided in this layer.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In some embodiments, aspects of discovery and/or recreation in virtual machine migration processing may be provided in this layer.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and discovery and/or recreation in virtual machine migration processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A system, comprising:
a hardware processor;
a memory device operatively coupled with the hardware processor;
the hardware processor operable to at least:
discover communication endpoints associated with a virtual machine designated for migration, the communication endpoints allowing the virtual machine to communicate with another logical partition on a physical machine, the virtual machine and said another logical partition being located on the physical machine;
discover properties associated with the communication endpoints; and
match a receive communication endpoint with a corresponding send communication endpoint in the communication endpoints,
wherein the communication endpoints include windows through which said virtual machine and said another logical partition can request coprocessor access and share data, the windows provided in a hypervisor by a switchboard facility associated with the communication endpoints, the properties discovered using at least one hypervisor call for querying the windows,
wherein at least the properties associated with the matched communication endpoints are used in recreating a communication channel for a migrated version of the virtual machine on another physical machine.

2. The system of claim 1, wherein the hardware processor is operable to discover the communication endpoints associated with a plurality of virtual machines designated for migration.

3. The system of claim 1, wherein the hardware processor is operable to discover the communication endpoints associated with the virtual machine designated for migration and a virtual I/O server servicing the virtual machine.

4. The system of claim 1, wherein the hardware processor is operable to obtain at least one local endpoint identification (ID) local to the virtual machine and at least one global endpoint ID of a corresponding receive endpoint for a send endpoint, in discovering the communication endpoints.

5. The system of claim 1, wherein the properties associated with the communication endpoints comprise endpoint type, global ID, receive first-in-first-out (FIFO) butter size and address for a receive endpoint, and a global ID of a corresponding receive endpoint for a send endpoint.

6. The system of claim 1, wherein the hardware processor is further operable to de-allocate the communication endpoints associated with the virtual machine.

7. The system of claim 1, wherein the hardware processor is operable to invoke at least one hypervisor call to discover the communication endpoints.

8. The system of claim 1, wherein the communication endpoints include data structure associated with hardware that is used to make connections between partitions on the physical machine.

9. The system of claim 1, wherein the communication endpoints are defined in a hypervisor associated with the physical machine.

10. A computer program product comprising a computer readable storage medium having program instructions embodied therewith, the program instructions executable by a device to cause the device to:

discover communication endpoints associated with virtual machines designated for migration, the communication endpoints allowing the virtual machines on a physical machine to communicate with one another;

discover properties associated with the communication endpoints; and match a receive communication endpoint with a corresponding send communication endpoint in the communication endpoints, wherein the communication endpoints include windows through which said virtual machine and said another logical partition can request coprocessor access and share data, the windows provided in a hypervisor by a switchboard facility associated with the communication endpoints, the properties discovered using at least one hypervisor call for querying the windows, wherein the properties are used in recreating a communication channel for migrated versions of the virtual machines.

11. The computer program product of claim 10, wherein the device is further caused to discover at least one communication endpoint associated with a virtual I/O server servicing at least one of the virtual machines.

12. The computer program product of claim 11, wherein the device is further caused to de-allocate the at least one communication endpoint associated with the virtual I/O server.

13. The computer program product of claim 10, wherein the device is caused to obtain at least one local endpoint identification (ID) local to the virtual machine and at least one global endpoint ID of a corresponding receive endpoint for a send endpoint, in discovering the communication endpoints.

14. The computer program product of claim 10, wherein the device is further caused to de-allocate the communication endpoints associated with the virtual machines.

15. The computer program product of claim 10, wherein the device is caused to invoke at least one hypervisor call to discover the communication endpoints.

16. The computer program product of claim 10, wherein the properties associated with the communication endpoints comprise endpoint type, global ID, receive first-in-first-out (FIFO) butter size and address for a receive endpoint, and a global ID of a corresponding receive endpoint for a send endpoint.

17. The computer program product of claim 10, wherein the communication endpoints include data structure associated with hardware that is used to make connections between partitions on the physical machine.

18. The computer program product of claim 10, wherein the communication endpoints are defined in a hypervisor associated with the physical machine.

19. A method comprising:

for a migrated virtual machine migrated on a target server, recreating a communication endpoint and a matched communication endpoint to establish at least one communication channel between the migrated virtual machine on the target server and another logical partition on the target server, the communication endpoint and the matched communication endpoint being data structure associated with hardware that is used to make connections between partitions on a physical machine where the target server is located, wherein the communication endpoints include windows through which said migrated virtual machine and said another logical partition can request coprocessor access and share data, the windows provided in a hypervisor by a switchboard facility associated with the communication endpoints, the recreating using at least one hypervisor call for allocating the windows.

20. The method of claim 19, wherein said another logical partition comprises a virtual I/O server on the target server.

* * * * *